United States Patent
Yoshino et al.

(10) Patent No.: US 11,007,459 B2
(45) Date of Patent: May 18, 2021

(54) FUEL PRE-FILTERING ELEMENT

(71) Applicants: Mahle Metal Leve S/A, Jundiai-Sp (BR); Mahle International GmbH, Stuttgart (DE)

(72) Inventors: Fernando Jun Yoshino, Rochester, MI (US); Felipe Ferrari, Sao Paulo (BR); Luiz Carlos Fritz, Sao Paulo (BR); Tadeu Geraldo Domingues, Sao Paulo (BR)

(73) Assignees: Mahle International GmbH; Mahle Metal Leve S/A

( * ) Notice: Subject to any disclaimer, the term of this patent is extended or adjusted under 35 U.S.C. 154(b) by 25 days.

(21) Appl. No.: 16/286,115

(22) Filed: Feb. 26, 2019

(65) Prior Publication Data
US 2019/0262746 A1    Aug. 29, 2019

(30) Foreign Application Priority Data
Feb. 27, 2018  (BR) .......................... 102018003899-0

(51) Int. Cl.
*B01D 27/08* (2006.01)
*B01D 27/14* (2006.01)
(Continued)

(52) U.S. Cl.
CPC ............. *B01D 27/08* (2013.01); *B01D 27/06* (2013.01); *B01D 27/148* (2013.01); *B01D 35/31* (2013.01);
(Continued)

(58) Field of Classification Search
CPC ...... B01D 27/08; B01D 36/006; B01D 35/31; B01D 27/06; B01D 27/148; B01D 36/003;
(Continued)

(56) References Cited

U.S. PATENT DOCUMENTS

2012/0012513 A1*  1/2012  Jokschas ............ B01D 46/2411
                                                          210/232

FOREIGN PATENT DOCUMENTS

CN       101850198 A    10/2010
DE       4419360 C1     8/1995
(Continued)

OTHER PUBLICATIONS

English machine translation of EP0559011.*
European Search Report dated Jul. 2, 2019 related to corresponding European Patent Application No. 19157781.6.

*Primary Examiner* — Madeline Gonzalez
(74) *Attorney, Agent, or Firm* — Fishman Stewart PLLC (57) ABSTRACT

A fuel pre-filtering element may comprise a casing provided with a fuel outlet, an internal tube, an upper annular element, a lower annular element, a filtering element and a cover. The filtering element may be arranged around the internal tube The upper and lower annular elements may be respectively fixed to the upper and lower ends of the filtering element The filtering element may be arranged inside the casing such that the internal tube establishes a contact with the fuel outlet, the upper annular element is arranged around the fuel outlet and in contact with an upper surface of the casing, and the upper annular element is deformed and forms an annular projection. The annular projection may establish a seal between the internal tube, the fuel outlet and the casing. The arrangement of the filtering element may be inside the casing and further form a region of unfiltered fuel.

16 Claims, 6 Drawing Sheets

(51) Int. Cl.
  *B01D 36/00* (2006.01)
  *B01D 35/31* (2006.01)
  *B01D 27/06* (2006.01)

(52) U.S. Cl.
  CPC ......... *B01D 36/003* (2013.01); *B01D 36/006* (2013.01); *B01D 2201/295* (2013.01); *B01D 2201/309* (2013.01); *B01D 2201/347* (2013.01)

(58) Field of Classification Search
  CPC ........ B01D 2201/347; B01D 2201/295; B01D 2201/309; B01D 35/30; B01D 2201/31; B01D 2201/316; B01D 2201/40; B01D 2201/4023; B01D 35/143; B01D 2201/291; B01D 2201/301; B01D 2201/304; B01D 2201/34
  USPC ....... 210/437, 441, 493.2, 94, 455, 457, 450
  See application file for complete search history.

(56) References Cited

FOREIGN PATENT DOCUMENTS

| | | | |
|---|---|---|---|
| DE | 102016206923 | A1 | 10/2017 |
| EP | 0559011 | A1 | 9/1993 |
| EP | 0685251 | A1 | 12/1995 |

\* cited by examiner

FUEL PRE-FILTERING ELEMENT

CROSS-REFERENCE TO RELATED APPLICATION

This application claims priority to Brazilian Application BR 102018003899-0 filed on Feb. 27, 2018, the contents of which are hereby incorporated by reference in its entirety.

TECHNICAL FIELD

The present invention relates to a fuel pre-filtering element. More specifically, the invention relates to a fuel pre-filtering element used in fuel supply lines for internal combustion engines that use diesel or biodiesel as fuel, which is provided with a new structural form/arrangement that results in a functional improvement in the use thereof.

BACKGROUND

It is known that engines that use diesel or biodiesel require special attention in terms of the quality of the fuel to be injected into the combustion chamber. One of the principal concerns relating to quality lies in the quantity of water present in the fuel.

The presence of water in the fuel may give rise not only to corrosion of the internal components of the engine but also may have an impact on fuel consumption, cause premature wear to the injection system, give rise to irregular combustion, etc.

Given the countless problems arising from the presence of water in the fuel, pre-filtering elements are used, these being placed upstream of the engine to be supplied with the fuel.

Currently, vehicles comprise a filter system and a fuel pre-filtering element, this latter providing a first step of removing impurities from the fuel and the water contained therein. Generally arranged behind the driver's cab in trucks the fuel pre-filtering element enables the driver to drain the water that has settled-out on a daily basis.

Inside the fuel pre-filtering element of the present state of the art it is common for there to be a single coalescing filtering means that on its surface collects the drops of water present in the fuel until larger drops form and settle out.

Pre-filtering elements of the state of the art are, furthermore, commonly made from metallic material. Such models have a high manufacturing and disposal cost since they have to be dismantled after scrapping in order for each of the materials of which they are made to receive the correct treatment.

Thus, the present state of the art lacks a fuel pre-filtering element with a novel structural form/arrangement that totally dispenses with the need to use seals, which is manufactured from simple materials that are easy to manufacture and easy to scrap, thus not using metallic materials, and which uses thermoplastic welding in order to hold all the components connected efficiently in fluid and mechanical terms.

SUMMARY

Therefore, one object of the present invention is to provide a fuel pre-filtering element that totally dispenses with the need to use internal seals of O-ring type or even welds.

A further object of the present invention is to provide a fuel pre-filtering element provided with upper and lower annular elements made from synthetic fabric of the fleece type, such a material being simple, easy to manufacture and easy to scrap. The lower annular element (lower fleece) further has tabs that contribute to the stability and guiding of the filtering element inside the casing.

Furthermore, it is also an object of the invention to provide a fuel pre-filtering element made from non-metallic materials, which results in a saving in terms of the cost of manufacture.

A further object of the invention is to provide a fuel pre-filtering element that uses thermoplastic welding to fuse the cover to the lower surface 10b of the casing, which results in an efficient fluidic and mechanical connection and fixing between all the components of the fuel pre-filtering element.

One or more above-mentioned object(s) of the invention, inter alia, is (are) achieved by means of a fuel pre-filtering element comprising: a casing provided with a fuel outlet, an internal tube, an upper annular element, a lower annular element, a filtering element and a cover, the filtering element being arranged around the internal tube, the upper and lower annular elements being fixed, respectively, to the upper and lower ends of the filtering element, the filtering element being arranged inside the casing such that i) the internal tube establishes a contact with the fuel outlet, ii) the upper annular element is arranged around the fuel outlet and in contact with an upper surface of the casing and the upper annular element is deformed and forms an annular projection, the annular projection establishing a seal between the internal tube, the fuel outlet and the casing, the arrangement of the filtering element inside the casing further forming a region of unfiltered fuel, the region of unfiltered fuel being the space formed between the internal walls of the casing and the external walls of the filtering element, the cover being pressed against the lower annular element and being fixed to a lower surface of the casing.

BRIEF DESCRIPTION OF THE DRAWINGS

The objects, technical effects and advantages of the fuel pre-filtering element of the invention will be apparent to a person skilled in the art on the basis of the following detailed description that makes reference to the appended figures that illustrate an exemplary, but non-limiting, embodiment of the invention.

DETAILED DESCRIPTION

Initially, it should be pointed out that the fuel pre-filtering element 1, which is the subject of the invention, will be described below in accordance with the embodiment shown in appended FIGS. 1 to 7.

As described above, the fuel pre-filtering element 1 is to be used in fuel supply lines for internal combustion engines that use diesel or biodiesel as fuel. The fuel pre-filtering element 1 is designed to remove impurities and water from the fuel, thereby preventing the corrosion of components, extending working life and improving the performance of the engine.

Figure 1:
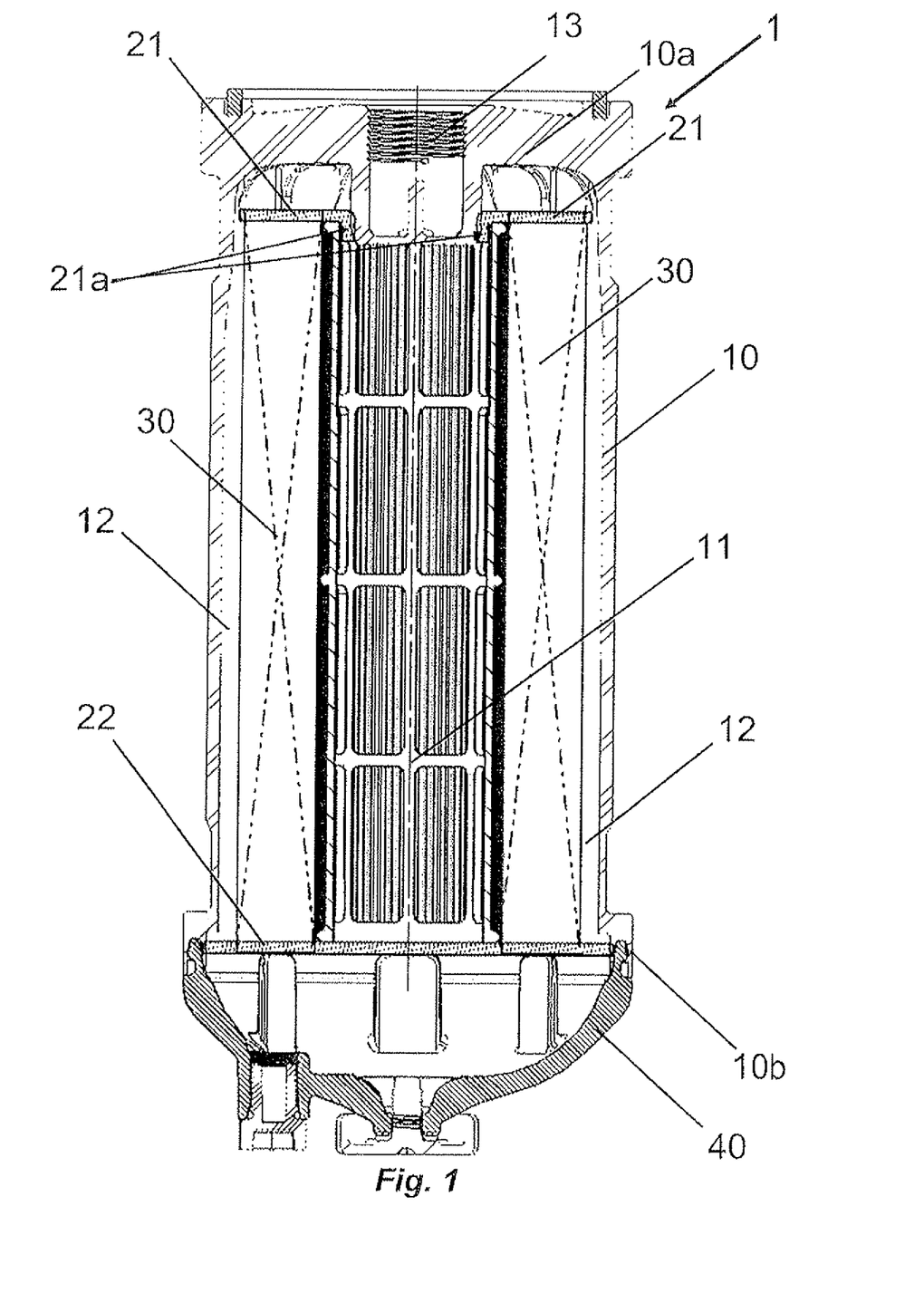
FIGS. 1 and 2 show sectional views of the fuel pre-filtering element according to the embodiments of the present model.
Figure 2:
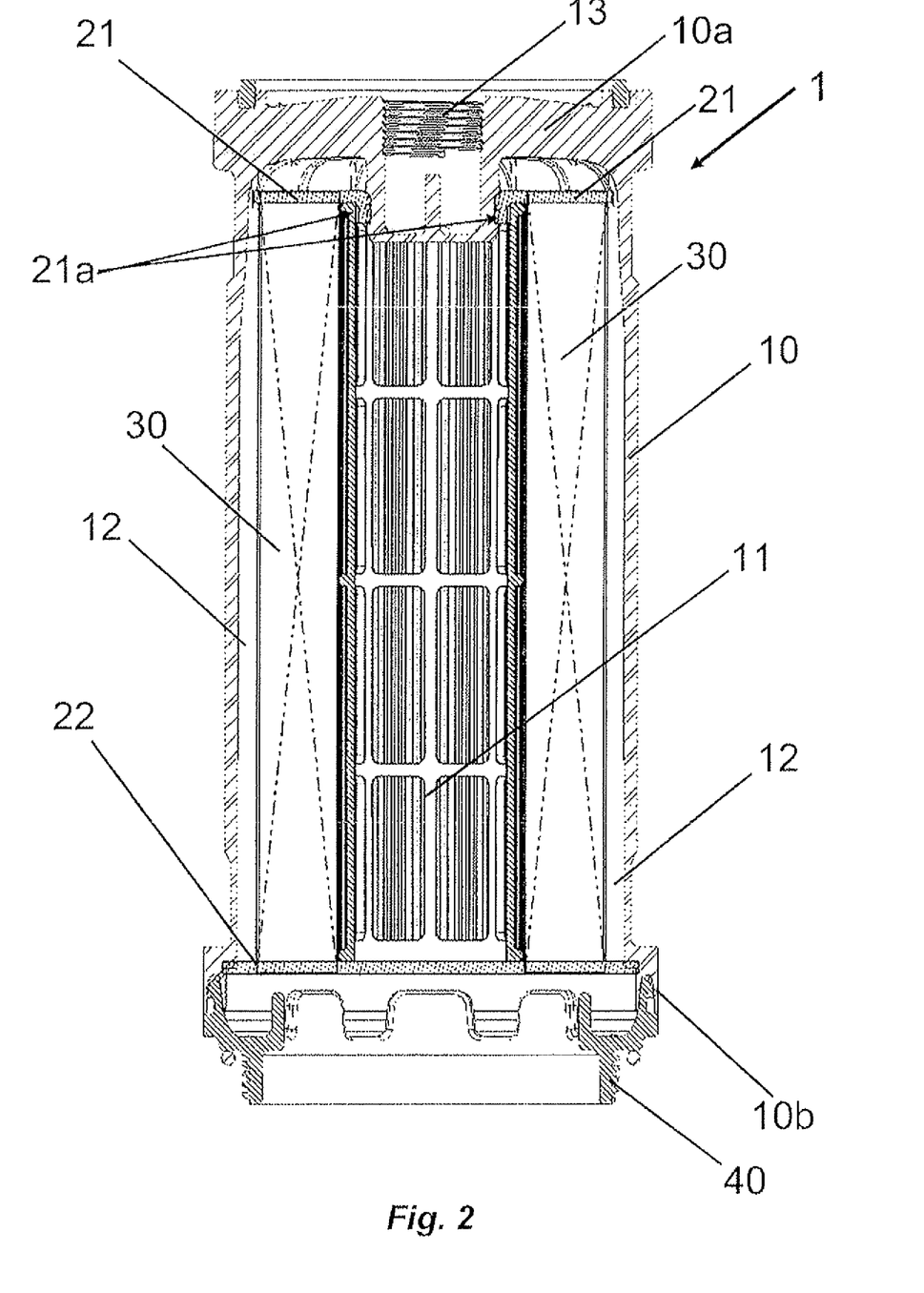
Figure 3:
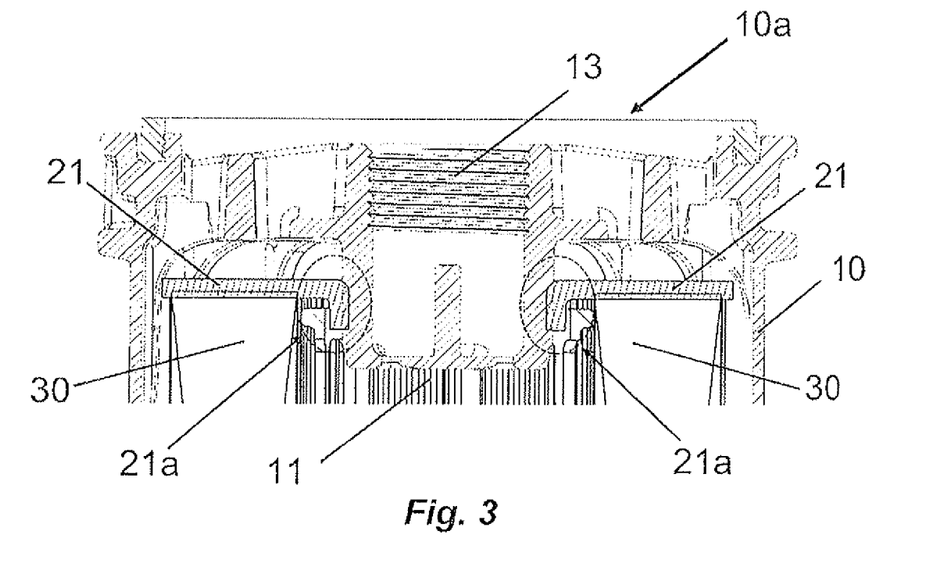
FIG. 3 shows a sectional view of the upper surface of the fuel pre-filtering element according to one embodiment of the present model.
Figure 4:
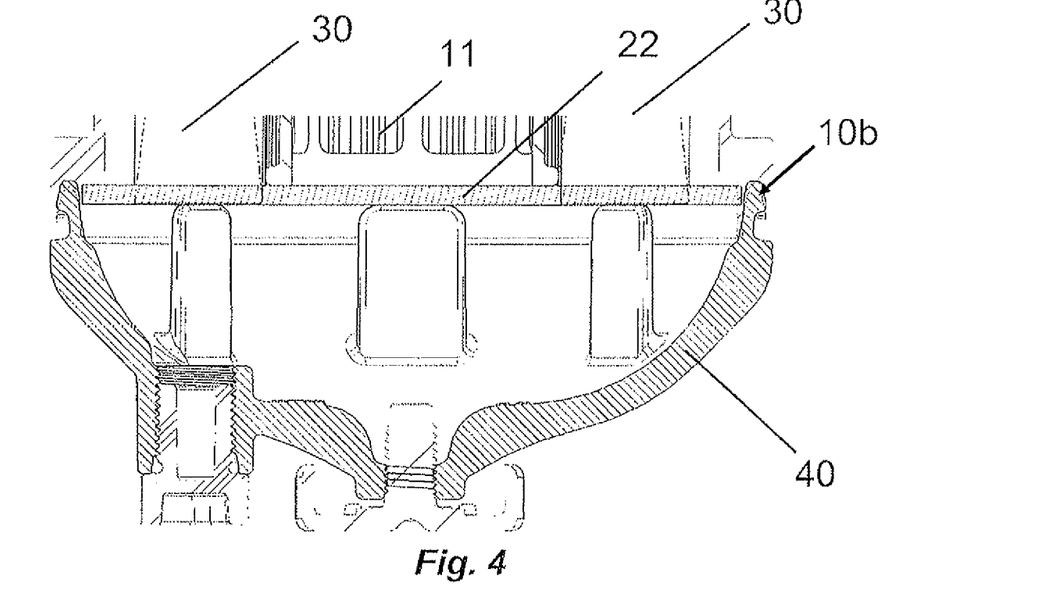
FIGS. 4 and 5 show sectional views of the lower surface of the fuel pre-filtering element according to one embodiment of the present model.
Figure 5:
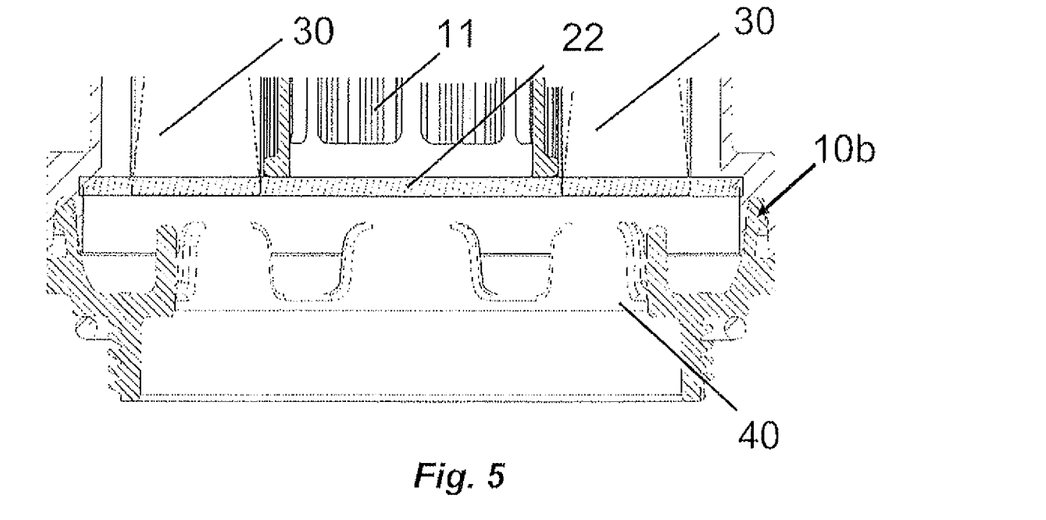
Figure 6A:
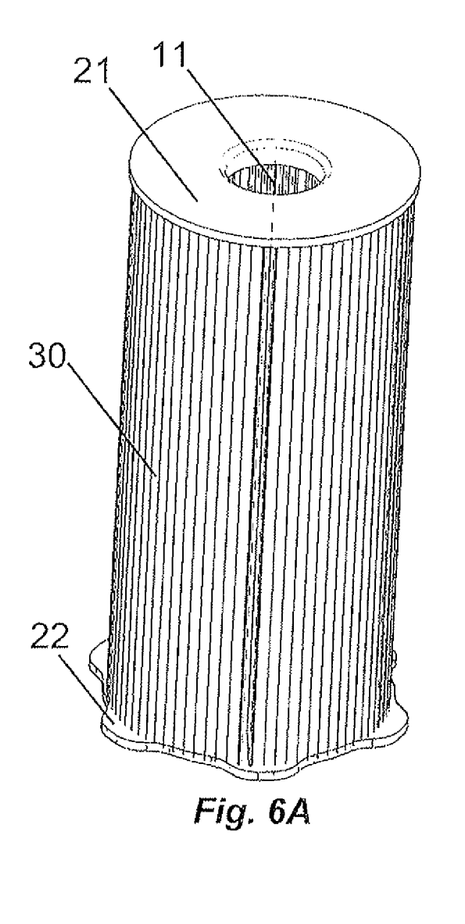
FIGS. 6a and 6B show perspective views of the upper and lower surfaces of the filtering element according to one embodiment of the present model.
Figure 6B:
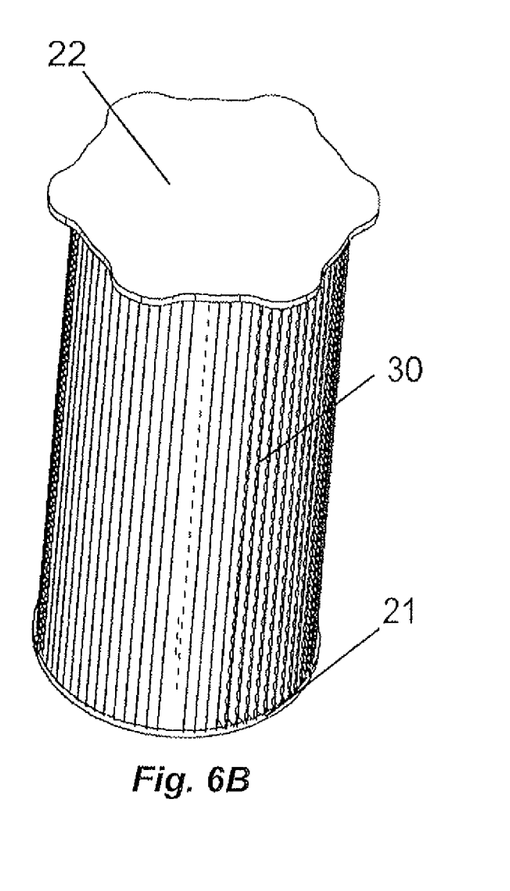

On the basis of FIGS. 1 and 2, it is noted that the fuel pre-filtering element 1 comprises a casing 10, an upper annular element 21, a lower annular element 22, a filtering element 30 and a cover 40.

Regarding the casing 10, it is noted that this has a substantially cylindrical geometric form and is provided with a fuel outlet 13. This latter is a through-orifice arranged in an upper surface 10a of the casing, which projects towards the interior of the casing 10. As will be described below, the fuel outlet 13 establishes a fluid communication with the internal tube 11.

In one embodiment of the invention, the casing 10 and the fuel outlet 13 are made from one and the same material such as, for example, polyamide, which is impact- and corrosion-resistant.

It should be noted that the fact that the material used is polyamide is not mandatory but only one example according to one embodiment of the invention. Thus, depending on the type of application, a person skilled in the art is able to choose to make use of a different type of material other than polymer, provided said material has properties similar to the given example and in accordance with the invention.

Regarding the upper annular element 21, it is noted that this has a substantially annular geometric form, provided with external and internal surfaces, i.e. the upper annular element 21 is provided with a through-orifice. It is important to note that the through-orifice has a diameter smaller than that of the fuel outlet 13, as will be described in detail below. In accordance with the teaching of the invention, the internal surface/through-orifice of the upper annular element 21 is designed to be deformed and to form an annular projection 21a, this latter being a shaped projection (or fold) that extends perpendicularly/radially relative to the surface of the upper annular element 21.

Regarding the lower annular element 22, it is noted that this has a substantially disk-shape geometric form, and may or may not have a through-hole and tabs that promote the stability and guiding of the filtering element 30 when mounted inside the casing 10.

In one embodiment of the invention, the upper and lower annular elements 21, 22 are made from a synthetic fabric of the fleece type. This material is particularly advantageous since it is simple, easy to manufacture and easy to scrap. As will be described in greater detail below, the synthetic material of fleece type facilitates the formation of the annular projection 21a in the upper annular element 21 and also replaces the sealing components commonly used in known prior art pre-filtering elements.

It should be noted that the fact that the material used is synthetic fabric of the fleece type is not mandatory but only an example according to one embodiment of the invention. Thus, depending on the type of application, a person skilled in the art is able to choose to use a different type of material other than synthetic fabric of the fleece type provided said fabric has properties similar to the given example in accordance with the invention.

Regarding the filtering element 30, it is noted that this is any component that produces fluid communication between a region of filtered fuel and a region of unfiltered fuel and that filters from the fluid compounds or aggregates that are undesirable (for example water or solid contaminants). In one embodiment of the invention, the filtering element 30 is defined by a medium that has a permeability such that it prevents or minimizes the passage of water to the area of filtered fuel and retains solid contaminants.

Regarding the cover 40, it is noted that this is essentially a cap designed to act as an elastic element for keeping the fuel pre-filtering element 1 assembled. Alternatively, the cover 40 may be designed to collect and to store the filtered water contained in the area of filtered fuel, i.e. the water that is filtered by the filtering element 30. The cover 40 has dimensions and a geometric form that interact with those of the lower surface 10b of the casing and is likewise made from polymeric materials, for example polyamide, which are impact- and corrosion-resistant and may, alternatively, be transparent.

It should be noted that the fact that the material used is polyamide is not mandatory but only one example according to one embodiment of the invention. Thus, depending on the type of application, a person skilled in the art may choose a different type of material other than polymer provided said material has properties similar to the given example in accordance with the invention.

All the components having been described, a description will be given below of how these are connected together in fluidic and mechanical terms such as to form the fuel pre-filtering element 1.

Figure 7:
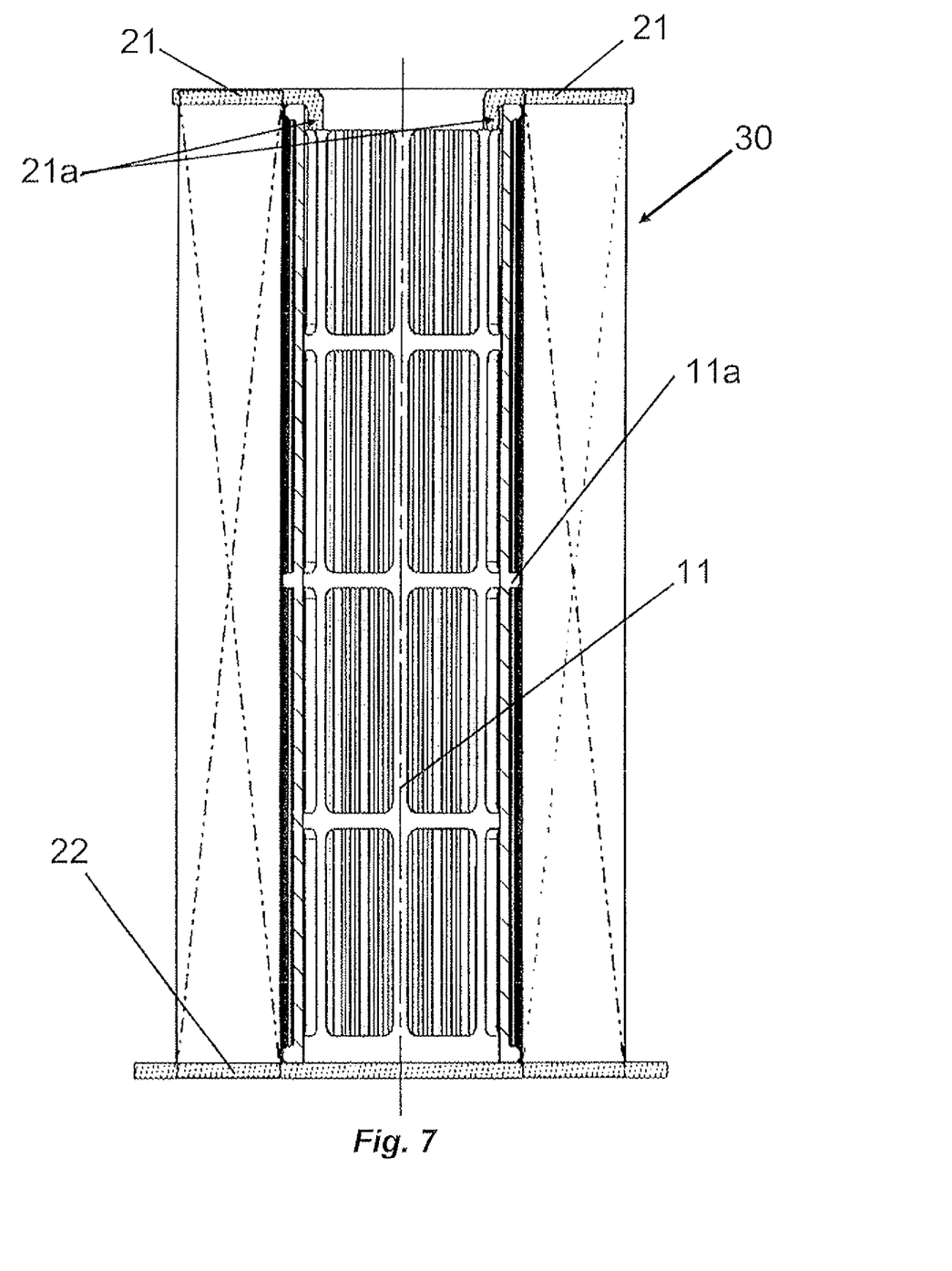
FIG. 7 shows a sectional view of the filtering element according to one embodiment of the present model.

Furthermore, with reference to the appended figures and especially FIG. 7, it is noted that the filtering element 30 is arranged around an internal tube 11, this latter having a surface with grates 11a (FIG. 7). The grates 11a are formed in order to provide a structure for supporting the filtering element 30 and are designed to allow the fluid filtered by the filtering element 30 to flow to the inside of the internal tube 11.

Furthermore, it is important to point out that the internal tube 11 has a length and radius of external surface of the grates 11a that interact with the length and radius of internal surface of the filtering element 30 such that the latter is efficiently fixed to the external surface of the internal tube 11.

The internal tube 11 is preferably also made from polymeric materials, for example polyamide, which are impact- and corrosion-resistant and may, alternatively, be transparent.

It should be noted that the fact that the material used is polyamide is not mandatory but only one example according to one embodiment of the invention. Thus, depending on the type of application, a person skilled in the art may choose a different type of material other than polymer provided said material has properties similar to the given example in accordance with the present model.

Furthermore, the upper and lower ends of the filtering element 30 and of the internal tube 11 are placed in contact and fixed (for example, by means of thermoplastic welding) to the upper and lower annular elements 21, 22.

Furthermore, with reference to FIGS. 1 and 2, it may be noted that the filtering element 30 is inserted inside the casing 10 such that the internal tube 11 establishes a fluidic, mechanical connection with the fuel outlet 13 and such that the through-orifice of the upper annular element 21 is arranged around the fuel outlet 13 and in contact with an upper surface 10a of the casing.

Bearing in mind that the through-orifice has a smaller diameter than that of the fuel outlet 13, it is noted that the upper annular element 21 will deform around the fuel outlet 13 and form the annular projection 21a. This effect is one of the principal advantages of the invention in light of known prior art pre-filtering elements since it totally dispenses with the need to use seals.

As illustrated in the figures and described above, the annular projection 21*a* projects from the fuel outlet 13 towards the interior of the internal tube 11.

According to the teaching of the invention, after the arrangement of the filtering element 30 inside the casing 10, a fuel inlet 12 is formed which relates to the region of unfiltered fuel. The fuel inlet 12 is arranged in the space formed between the internal walls of the casing 10 and the external walls of the filtering element 30. Regarding the region of filtered fuel, it is noted that this relates to the interior of the internal tube 11 that receives the fuel filtered by the filtering element 30.

With reference to FIGS. 1, 2, 4 and 5, it is noted that complete assembly of the fuel pre-filtering element 1 is achieved when the cover 40 is pressed against the lower annular element 22 and fixed—by means of threading and welding—to a lower surface 10*b* of the casing. As described above, the cover 40 is designed to keep the entire fuel pre-filtering element 1 assembled and to collect and to store the water filtered by the filtering element 30.

Thus, this novel structural form/arrangement proposed by the present model results in a functional improvement in the use thereof, since the fuel pre-filtering element 1 totally dispenses with the need to use seals through the use of upper and lower annular elements made from synthetic fabric of the fleece type, said material being simple, easy to manufacture and easy to scrap.

Furthermore, the use of thermoplastic welding for fusing the cover 40 to the lower surface 10*b* of the casing enables the fuel pre-filtering element 1 to be kept assembled and all the components to be efficiently connected in fluidic and mechanical terms.

Despite the description of the particular embodiment above relating to a particular example, the present invention may be embodied in similar ways, and may be given modifications in terms of the implementation thereof such that the scope of protection of the invention is limited only by the content of the appended claims, including all possible equivalent variations made to the model.

The invention claimed is:

1. A fuel pre-filtering element, comprising:
a casing provided with a fuel outlet;
an internal tube;
an upper annular element;
a lower annular element;
a filtering element; and
a cover,
wherein the filtering element is arranged around the internal tube, the upper and lower annular elements being fixed respectively to the upper and lower ends of the filtering element,
the filtering element being arranged inside the casing such that i) the internal tube establishes a contact with the fuel outlet, ii) the upper annular element is arranged around the fuel outlet and in contact with an upper surface of the casing, and iii) the upper annular element is deformed and forms an annular projection,
the annular projection extending to an interior surface of the internal tube, thereby sealing the internal tube, the fuel outlet and the casing,
the filtering element inside the casing further forming a region of unfiltered fuel,
the region of unfiltered fuel being a space formed between internal walls of the casing and external walls of the filtering element,
the cover being pressed against the lower annular element and being fixed to a lower surface of the casing, and
wherein the lower annular element is provided with tabs that extend radially outward beyond the external walls of the filtering element to form a variable circumference.

2. The fuel pre-filtering element according to claim 1, wherein the upper and lower annular elements are made from a synthetic fabric of the fleece type and the casing, the internal tube and the cover are made from polyamide.

3. The fuel pre-filtering element according to claim 1, wherein the cover is transparent.

4. The fuel pre-filtering element according to claim 1, wherein the cover has a screw thread.

5. The fuel pre-filtering element according to claim 1, wherein the cover is welded to the lower surface of the casing.

6. A system of fuel pre-filtering, comprising:
a casing with a fuel outlet;
an internal tube;
an upper annular element;
a lower annular element;
a filtering element;
a cover;
wherein the filtering element is arranged around the internal tube, the upper and lower annular elements being fixed respectively to the upper and lower ends of the filtering element, and the filtering element being arranged inside the casing such that the internal tube establishes a contact with the fuel outlet;
wherein the upper annular element is arranged around the fuel outlet and is deformed around the fuel outlet to form an annular projection, the annular projection extending towards an interior of the internal tube, thereby sealing the internal tube, the fuel outlet and the casing;
wherein the cover is welded to a lower surface of the casing, thereby fusing the cover to the casing; and
wherein the lower annular element includes tabs that extend radially outward beyond external walls of the filtering element to form a variable circumference.

7. The system of claim 6, wherein the upper annular element has a through-orifice arranged around the fuel outlet, the fuel outlet being disposed on an upper surface of the casing.

8. The system of claim 6, wherein the filtering element is inside the casing and is configured to form a region of unfiltered fuel.

9. The system of claim 8, wherein the region of unfiltered fuel is a space formed between internal walls of the casing and external walls of the filtering element.

10. The system of claim 6, wherein the cover is pressed against the lower annular element and arranged to collect water filtered by the filtering element in a space between the cover and the lower annular element.

11. The system of claim 6, wherein the upper and lower annular elements include a synthetic fabric of the fleece type, and the casing, the internal tube and the cover include polyamide.

12. The system of claim 6, wherein the cover is transparent.

13. The system of claim 6, wherein the cover includes a screw thread.

14. A fuel pre-filtering device, comprising:
a casing with a fuel outlet;
an internal tube;
an upper annular element;
a lower annular element;
a filtering element;
a cover;
wherein the filtering element is arranged around the internal tube, the upper and lower annular elements being fixed respectively to the upper and lower ends of the filtering element, the filtering element being arranged inside the casing such that: i) the internal tube establishes a contact with the fuel outlet, ii) the upper annular element is arranged around the fuel outlet disposed on an upper surface of the casing, and iii) the upper annular element is deformed around the fuel outlet and forms an annular projection around the fuel outlet;
the annular projection extending to an interior surface of the internal tube, thereby sealing the internal tube, the fuel outlet and the casing;
the filtering element arranged inside the casing to form an unfiltered fuel space between internal walls of the casing and external walls of the filtering element;
the cover structured and arranged to collect and store water filtered by the filtering element;
the cover being pressed against the lower annular element, such that the filtered water is stored between the cover and the lower annular element;
wherein the cover is fixed to a lower surface of the casing by welding; and
wherein the lower annular element has tabs that extend radially outwards beyond the external walls of the filtering element to form a variable circumference.

15. The device of claim 14, wherein the casing, the internal tube and the cover are composed of polyamide.

16. The device of claim 15, wherein the upper annular element and the lower annular element are each composed of a synthetic material of the fleece type.

* * * * *